Patented Dec. 14, 1926.

1,610,624

UNITED STATES PATENT OFFICE.

HENRIETTA MAMIE SLADE, OF OAKFIELD, GEORGIA.

COMPOSITION OF MATTER FOR USE AS KINDLING.

No Drawing. Application filed September 18, 1925. Serial No. 57,214.

This invention relates to a composition of matter for use as kindling, one of the objects of the invention being to provide a preparation which is cheap to manufacture, can be handled readily, will not become ignited by sparks, will not soften so as to spread or drip, and which will burn smoothly to an ash.

A further object is to provide a composition of this kind which can be easily molded to desired shape and afterwards hardened.

A still further object is to provide a composition of matter which, when ignited, will produce an intense heat and be consumed slowly.

With the foregoing and other objects in view which will appear as the description proceeds, the invention consists of the following ingredients substantially in the proportions stated, to wit,

| | Pounds. |
|---|---|
| Sawdust | 40 |
| Gum rosin | 30 |
| Pure gum from yellow pine | 20 |
| Gasoline | 10 |

In mixing the parts it is essential that the sawdust be dry. This sawdust is screened and placed in a mixing vat after which the gasoline is added and the two ingredients mixed thoroughly.

The gum rosin is heated to substantially 260° F. The pine gum is heated to a temperature of approximately 180° F., the two ingredients being heated in separate vessels after which they are mixed together and this mixture added to the contents of the vat where the several ingredients are thoroughly mixed. The resultant mixture is plastic when cold and can be easily molded into sticks, balls or blocks. The gasoline serves to hold the ingredients pliable so that the product can be readily shaped but as this gasoline evaporates the product becomes hard. The gum rosin and the pure gum of the yellow pine constitute the highly inflammable portions of the preparation while the sawdust constitutes the filler or base. As all of the parts are combustible the composition, when ignited, will be completely consumed except for the fine ash produced.

In practice it has been found that the gasoline, which evaporates quickly, will leave the kindling firm and hard within twenty-four hours. This kindling can be handled like wood, coal or the like and while it will not be ignited by sparks it can be easily ignited by a flame and will produce an intense heat.

What is claimed is:

1. The herein described method of producing a kindling which consists in mixing together sawdust and gasoline, melting in separate receptacles gum rosin and the pure gum of yellow pine, mixing together said melted ingredients and adding them to the mixture of sawdust and gasoline, molding the composition to a desired shape, and allowing the gasoline to evaporate, thereby to produce a non-plastic product.

2. The herein described method of making a kindling compound which consists in mixing ten pounds of gasoline with approximately 40 pounds of screened sawdust, melting 30 pounds of gum rosin and 20 pounds of the pure gum of yellow pine in separate receptacles, combining the melted ingredients with the mixture of sawdust and rosin and thoroughly mixing them to produce a cold plastic preparation, molding said preparation into desired shapes and sizes and allowing the gasoline to evaporate, thereby to produce a non-plastic product.

3. The herein described method of producing a kindling which consists in mixing approximately 10 pounds of gasoline with approximately forty pounds of dry sawdust, heating approximately 30 pounds of gum rosin to a temperature of approximately 260° F., heating approximately 20 pounds of the pure gum of yellow pine to a temperature of approximately 180° F., mixing the two heated ingredients and subsequently adding them to and mixing them with the mixture of sawdust and gasoline, thereafter molding the cold plastic material into desired shapes and sizes, and thereafter allowing the gasoline to evaporate to leave hard products of a highly combustible nature.

In testimony that I claim the foregoing as my own, I have hereto affixed my signature.

MRS. TUMP A. SLADE.